UNITED STATES PATENT OFFICE.

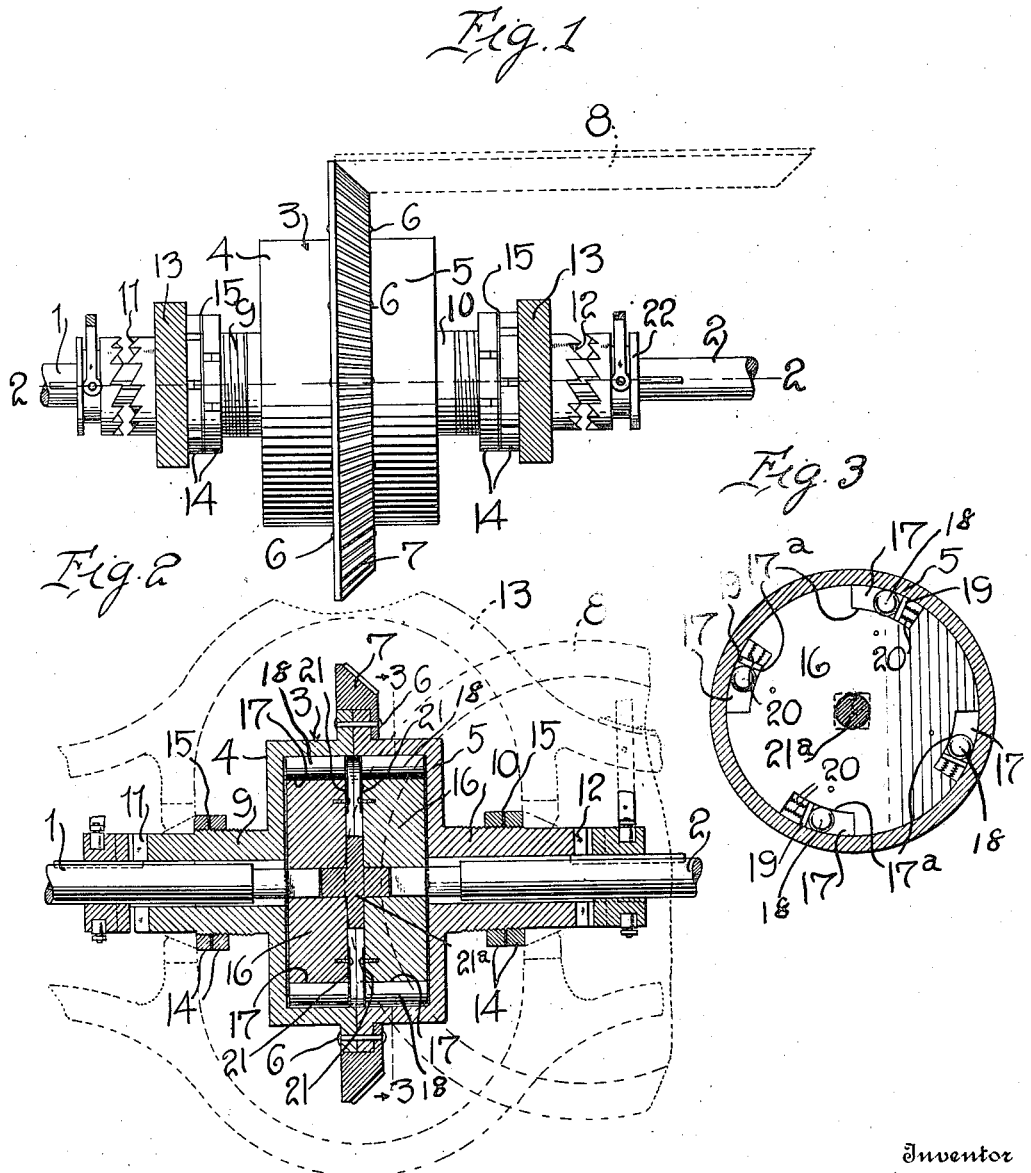

BERRIEN M. LINDSLEY, OF DALLAS, TEXAS.

DIFFERENTIAL DRIVING MECHANISM.

1,145,378.   Specification of Letters Patent.   Patented July 6, 1915.

Application filed November 10, 1914. Serial No. 871,313.

*To all whom it may concern:*

Be it known that I, BERRIEN M. LINDSLEY, a citizen of the United States, residing at Dallas, in the county of Dallas and State of Texas, have invented certain new and useful Improvements in Differential Driving Mechanism, of which the following is a specification.

My invention consists in a novel differential driving mechanism hereinafter described with reference to the accompanying drawing, in which I have illustrated one form in which the invention may be embodied, it having been selected by me for the purpose of illustrating the invention.

My said invention is more fully disclosed in the following description and claims.

Referring to the figures of said drawing:—Figure 1 is an elevation of a differential mechanism embodying my invention and designed particularly for providing a compensating movement between vehicle wheels or similar devices, although it may be used for other purposes. Fig. 2 is a longitudinal horizontal sectional view taken on line 2—2 of Fig. 1. Fig. 3 is a transverse vertical section taken on line 3—3 of Fig. 2.

The object of my invention is to provide a differential mechanism wherein the arrangement and mechanical construction of the various parts will permit the driven axles to rotate at different speeds, relative to one another, while being driven from a common driving member, whereby the increasing movement, which is known as a "compensating movement" is obtained, thereby permitting the power transmitted from the motor to be equally divided between the driven axles and wheels in such manner that either driven axle or wheel is at all times free to take the initiative during the periods of increasing or decreasing speed.

Further objects of my invention are to provide a differential mechanism which will be simple in design and construction; that may be reversed by a simple clutch mechanism; and which will automatically lock upon one of the axles should the opposite axle break; and a differential which may be manufactured at a comparatively small cost owing to the extreme simplicity of parts.

Referring to the characters of reference 1 and 2 designate the axle sections respectively, on which are mounted the traction wheels, not shown. Inclosing the differential mechanism, hereinafter described, is a housing 3 formed of two sections 4 and 5, connected together by means of bolts 6 which also connect the housing with a bevel gear 7, driven by means of the bevel gear 8 from the engine, (not shown). Each end of the housing 3 is extended in the form of sleeves 9 and 10 which are provided on their ends with teeth 11 and 12, for a purpose hereinafter described. The entire mechanism, including the housing 3, is inclosed within a casing 13 and the sleeves 9 and 10 extend through bearings in said casing and are held in proper position by means of adjustable nuts 14 having lock washers 15 provided between them. The axles 1 and 2 extend through the sleeves 9 and 10 and their inner ends are squared and enter square apertures in disks 16, within said housing 3. Each of the disks 16 is provided on its periphery with a plurality of notches or recesses 17 which are spaced apart and have tapered bottoms 17ª. Mounted in said recesses are rollers 18 which are of greater diameter than the distance between the bottoms 17ª at the shallow ends of the recesses 17 and the inner surface of the housing 3, whereby when the rollers are forced toward the smaller ends of the recesses by means of stops 19 and springs 20, the disks 16 and housing 3 will be united and turn as a unit. As the axles are rigidly connected with the disks 16 they will, of course, move with the housing at the same speed.

In turning the vehicle from its straight course, such as in rounding a corner, the outside wheel must run faster than the other, and by my improved construction this is accommodated as either one of the wheels can at all times run faster than the housing, but never slower.

Plates 21 are secured to the disks to prevent the rollers and their operating mechanisms from leaving their respective recesses and a distance piece 21ª is provided between and extends into each of said disks 16 to hold the same apart and to reinforce the rear axle.

When it is desired to reverse the direction of movement of the vehicle a clutch collar 22, keyed for longitudinal but not rotary movement upon the axle 2, is thrown into mesh with the teeth 12, from the reverse rod in the transmission mechanism (not shown), which has been reversed, and the power will then be transmitted from the housing 3 by means of the sleeve 10 directly to the axle 2 and the machine will be reversed.

From the foregoing description of the construction and operation of my improved differential mechanism, it will be seen that my device contemplates the following advantages, viz., the absolute elimination of skidding due to one wheel being driven faster than the other, as in my device the slow running or stuck wheel will always take the power regardless of the other wheel being free from traction; my device will also obviate the racing of the motor due to one wheel bounding free of the ground when the automobile or other analogous machine is driven at high speed as the wheel with traction is always driving.

What I claim and desire to secure by Letters Patent is:—

1. A differential mechanism comprising axles, disks provided on the inner ends of said axles having recesses with tapered bottoms provided in their peripheries, a housing adapted to be actuated from the source of power, said housing inclosing said disks, rollers provided in said recesses, means also provided in said recesses for forcing said rollers toward the shallow ends of said recesses, and a distance piece provided between and extending into said disks for separating the same and reinforcing the rear axle.

2. A differential mechanism including axles, a driven housing, disk-like members within said housing and each having a positive driving connection with one of said axles and one-way driving connection with said housing, and a reinforcing distance piece loosely engaging said disk-like members and forming therewith means to hold said axles in alinement.

3. A differential mechanism including alined axles, a driven disk-like member on each axle and disposed in opposed and spaced relation with respect to each other and having central bores, a distance piece interposed between said members and having oppositely extending trunnions projecting into said bores to support said axles against dis-alinement, and driving mechanism co-acting with said members to drive the same in one direction.

4. In a differential mechanism, a casing, one-way driving mechanism within said casing including a housing having sleeves journaled in said casing and provided with clutch members, axles supported in said sleeves and driven by said mechanism, clutch members splined on said axles exteriorly of said casing and co-acting with said first-mentioned clutch members to form a reverse driving connection, and nuts mounted on said sleeves and engaging said casing to support said housing against displacement by lateral thrust.

5. A differential mechanism including axles, driving mechanism for said axles including a housing, disk-like members in said housing each having positive driving connection with one of said axles, said members having peripheral recesses shallow at one end, rollers in said recesses for driving engagement with said housing when moved to the shallow end of said recesses by rotation of said housing in one direction, and spring supported plates at the deep end of said recesses forming resilient stops for said rollers when said axles are rotated faster than said housing and normally tending to press said rollers toward the shallow ends of said recesses.

In testimony whereof I affix my signature in presence of two witnesses.

BERRIEN M. LINDSLEY.

Witnesses:
  O. O. TAUCHSTONE,
  PRENTICE WILSON.